(12) United States Patent
Yamada et al.

(10) Patent No.: US 10,103,606 B2
(45) Date of Patent: Oct. 16, 2018

(54) MOTOR INCLUDING SENSOR UNIT WITH IMPROVED DETECTION

(71) Applicant: NIDEC CORPORATION, Minami-ku, Kyoto (JP)

(72) Inventors: Yosuke Yamada, Kyoto (JP); Ryusuke Sato, Kyoto (JP); Yasuaki Nakahara, Kyoto (JP); Yusuke Makino, Kyoto (JP); Hisashi Fujihara, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 205 days.

(21) Appl. No.: 15/146,258

(22) Filed: May 4, 2016

(65) Prior Publication Data

US 2016/0352189 A1 Dec. 1, 2016

(30) Foreign Application Priority Data

May 29, 2015 (JP) .................................. 2015-110886

(51) Int. Cl.
*H02K 11/00* (2016.01)
*H02K 11/215* (2016.01)
*H02K 5/04* (2006.01)
*H02K 5/22* (2006.01)
*H02K 11/33* (2016.01)

(52) U.S. Cl.
CPC ............. *H02K 11/215* (2016.01); *H02K 5/04* (2013.01); *H02K 5/225* (2013.01); *H02K 11/33* (2016.01)

(58) Field of Classification Search
CPC ...... H02K 1/04; H02K 11/00; H02K 2203/09; H02K 29/08; H02K 11/33; H02K 11/21; H02K 2203/03; H02K 5/225; H02K 5/04

USPC ............................................ 310/68 B, 71, 89
See application file for complete search history.

(56) References Cited

U.S. PATENT DOCUMENTS

| | | | |
|---|---|---|---|
| 2007/0205679 A1 | 9/2007 | Terauchi et al. | |
| 2008/0017438 A1* | 1/2008 | Kanda | B62D 5/0403 180/443 |
| 2010/0320880 A1* | 12/2010 | Kamogi | H02K 11/33 310/68 B |
| 2011/0006625 A1* | 1/2011 | Fujii | H02K 3/522 310/71 |

(Continued)

FOREIGN PATENT DOCUMENTS

| | | | |
|---|---|---|---|
| JP | 2004248492 A | | 9/2004 |
| JP | 2007221976 A | * | 8/2007 |

(Continued)

*Primary Examiner* — Thanh Lam
(74) *Attorney, Agent, or Firm* — Cantor Colburn LLP (57) ABSTRACT

A case includes a cylindrical housing arranged to hold a stator, and having an opening portion at a top thereof; and a motor cover fitted to an upper side of the housing, and arranged to cover an upper side of the stator. A busbar unit includes a sensor busbar electrically connected to a rotation sensor, and a busbar holder arranged at the opening portion to hold the sensor busbar. The case includes a case through hole arranged to open into a space outside of the case. The busbar holder includes a cylindrical holder body portion having at least a portion thereof arranged radially inside of the opening portion; and a protruding portion arranged to protrude out of the case, and having at least a portion thereof arranged in the case through hole. A gap is defined circumferentially between the protruding portion and an edge of the case through hole.

14 Claims, 8 Drawing Sheets

(56) References Cited

U.S. PATENT DOCUMENTS

2016/0285331 A1* 9/2016 Ichikawa ............... G01D 5/145

FOREIGN PATENT DOCUMENTS

| JP | 2010284007 A | * | 12/2010 |
| JP | 2014158409 A | * | 8/2014 |

* cited by examiner

MOTOR INCLUDING SENSOR UNIT WITH IMPROVED DETECTION

CROSS REFERENCE TO RELATED APPLICATION

The present invention claims priority under 35 U.S.C. § 119 to Japanese Application No. 2015-110886 filed May 29, 2015, the entire content of which is incorporated herein by reference.

FIELD OF THE INVENTION

The present invention relates to a motor.

BACKGROUND

Many motors include a sensor unit to detect at least one of a rotational position of a rotor, a rotation rate, and a torque.

In such a motor, sensor elements are typically used to detect magnetic flux of a sensor magnet attached to the rotor, and the rotational position of the rotor is calculated based on the detection. Based on the calculated rotational position of the rotor, electric drive currents are controlled to efficiently control the motor.

When assembling the motor, an error may occur in fitting components of the motor to each other. Thus, displacement of the positions of the sensor elements relative to the sensor magnet may occur. Such displacement makes it impossible to accurately detect the rotational position of the rotor through the sensor elements, making it difficult to efficiently control the motor. Accordingly, when assembling the motor, it is necessary to adjust the positions of the sensor elements relative to the sensor magnet after fitting of the sensor elements and the sensor magnet is completed.

SUMMARY

A motor according to a embodiment of the present invention includes a rotor including a shaft having a central axis extending in a vertical direction as a center thereof; a bearing arranged to support the shaft; a stator arranged radially outside of the rotor; a busbar unit arranged on an upper side of the stator; a case arranged to accommodate the rotor, the stator, and the busbar unit; a sensor magnet arranged on the upper side of the stator, and fixed directly or indirectly to the shaft; and a rotation sensor held by the busbar unit, and arranged axially opposite to the sensor magnet. The case includes a cylindrical housing arranged to hold the stator, and having an opening portion at a top thereof; and a motor cover fitted to an upper side of the housing, and arranged to cover the upper side of the stator. The busbar unit includes a sensor busbar electrically connected to the rotation sensor; and a busbar holder arranged at the opening portion to hold the sensor busbar. The case includes a case through hole arranged to open into a space outside of the case. The busbar holder includes a cylindrical holder body portion having at least a portion thereof arranged radially inside of the opening portion; and a protruding portion arranged to protrude out of the case, and having at least a portion thereof arranged in the case through hole. A gap is defined circumferentially between the protruding portion and an edge of the case through hole.

The above and other elements, features, steps, characteristics and advantages of the present invention will become more apparent from the following detailed description of the embodiments with reference to the attached drawings.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF EMBODIMENTS

Hereinafter, motors according to embodiments of the present invention will be described with reference to the accompanying drawings. Note that the scope of the present invention is not limited to the embodiments described below, but includes any modification thereof within the scope of the technical idea of the present invention. Also note that scales, numbers, and so on of members or portions illustrated in the accompanying drawings may differ from those of actual members or portions, for the sake of easier understanding of the members or portions.

In the accompanying drawings, an xyz coordinate system is shown appropriately as a three-dimensional orthogonal coordinate system. In the xyz coordinate system, a z-axis direction is assumed to be a direction parallel to a central axis J shown in FIG. 1. An x-axis direction is assumed to be a direction perpendicular to the z-axis direction, and is assumed to be a horizontal direction in FIG. 1. A y-axis direction is assumed to be a direction perpendicular to both the x-axis direction and the z-axis direction.

It is assumed in the following description that a direction in which the central axis J extends (that is, the z-axis direction) is a vertical direction. A positive side (i.e., a +z side) in the z-axis direction will be referred to as an upper side, while a negative side (i.e., a −z side) in the z-axis direction will be referred to as a lower side. It should be noted, however, that the above definitions of the vertical direction and the upper and lower sides are made simply for the sake of convenience in description, and are not meant to restrict actual relative positions or directions of different members or portions. Unless otherwise specified, the direction parallel to the central axis J (i.e., the z-axis direction) will be simply referred to by the term "axial direction", "axial", or "axially", radial directions centered on the central axis J will be simply referred to by the term "radial direction", "radial", or "radially", and a circumferential direction about the central axis J (i.e., a $\theta_z$ direction) will be simply referred to by the term "circumferential direction", "circumferential", or "circumferentially".

It is assumed that the wording "to extend in an axial direction", "to extend axially", or the like as used in the following description includes not only to extend exactly in the axial direction but also to extend in a direction at an angle of less than 45 degrees to the axial direction. It is assumed that the wording "to extend in a radial direction", "to extend radially", or the like as used in the following description includes not only to extend exactly in a radial direction or exactly radially, that is, exactly in a direction or directions perpendicular to the axial direction, but also to extend in a direction or directions at an angle of less than 45 degrees to the radial direction(s).

Figure 1:
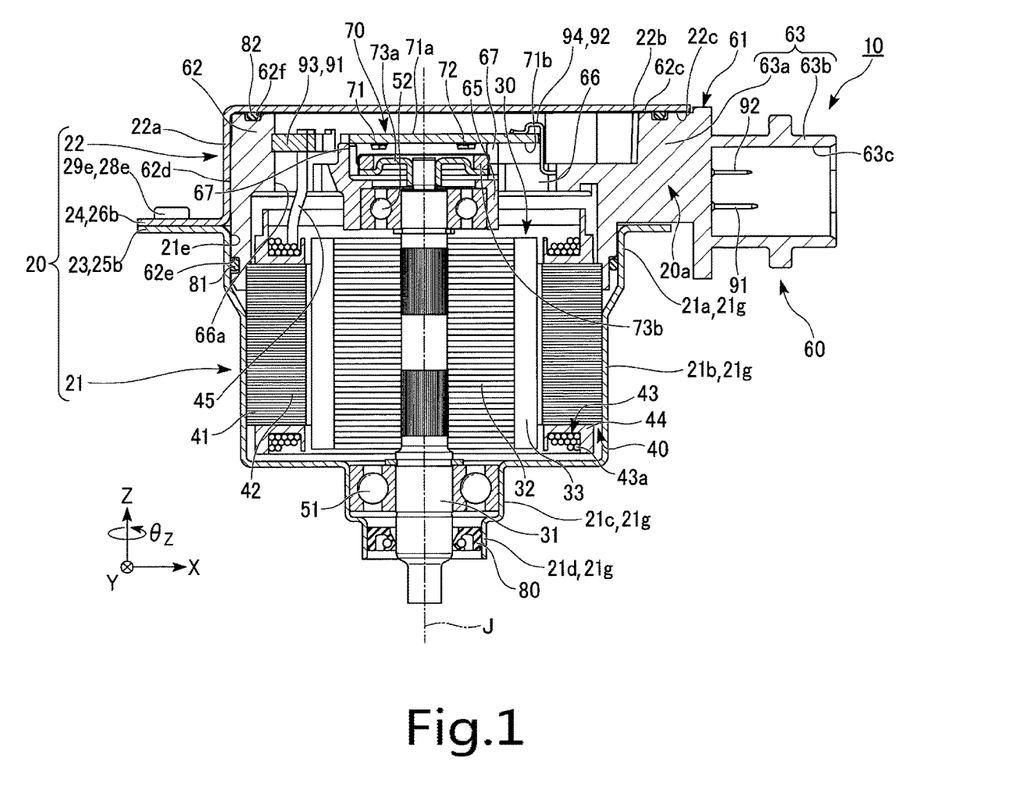
FIG. 1 is a cross-sectional view of a motor according to an embodiment of the present invention.
Figure 2:
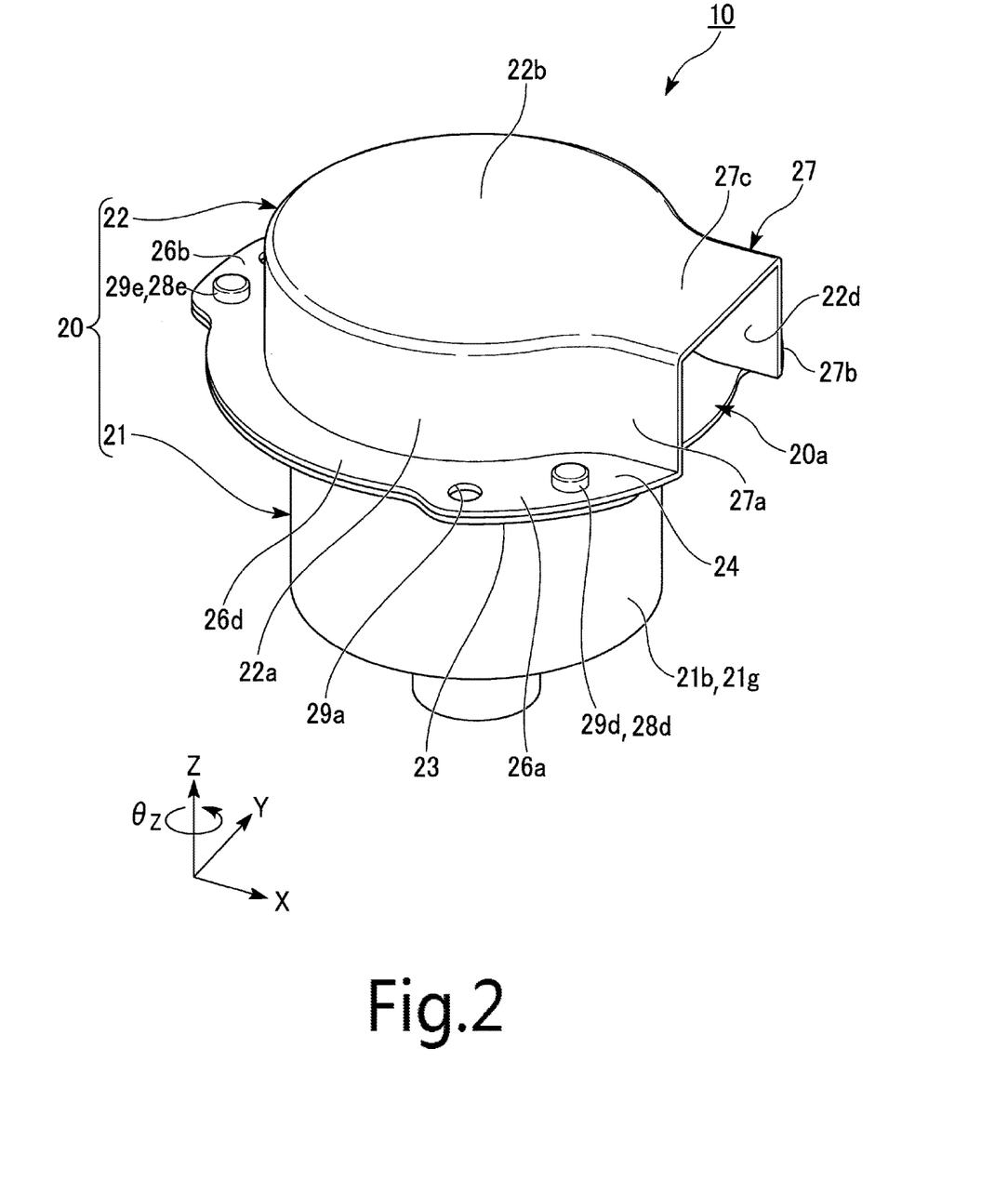
FIG. 2 is a perspective view of the motor according to the above embodiment of the present invention.
Figure 3:
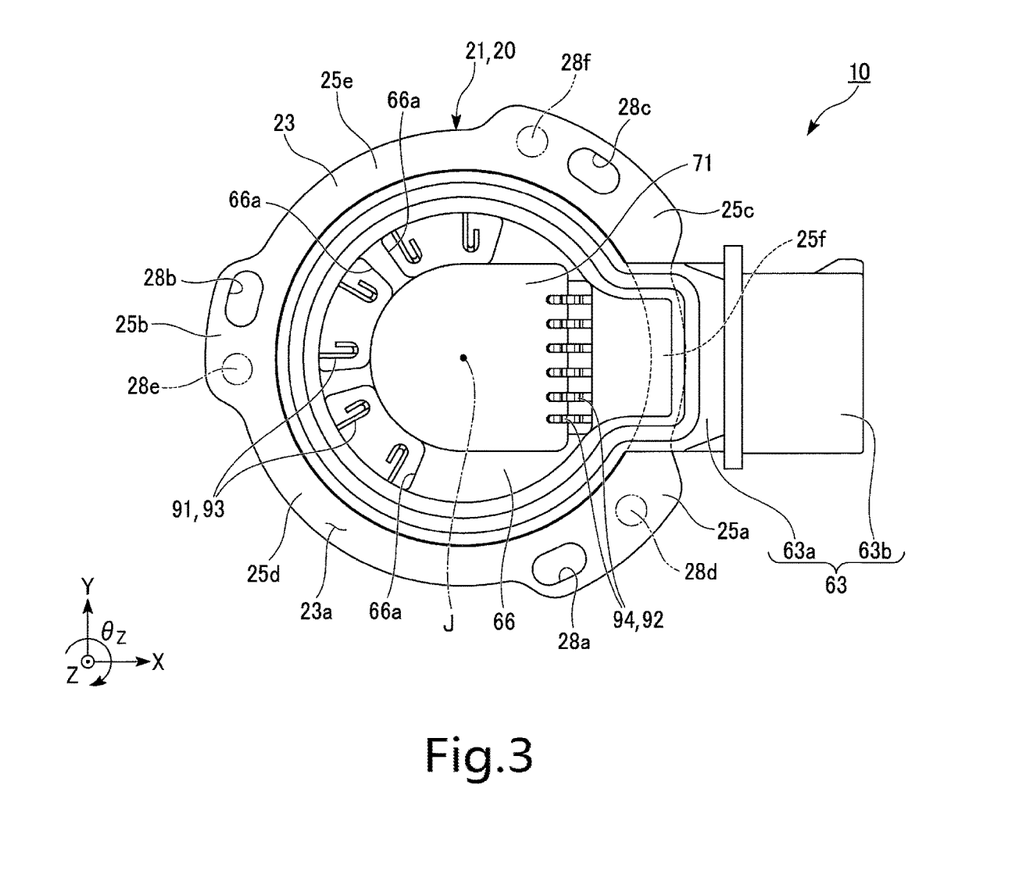
FIG. 3 is a plan view of the motor according to the above embodiment of the present invention.
Figure 4:
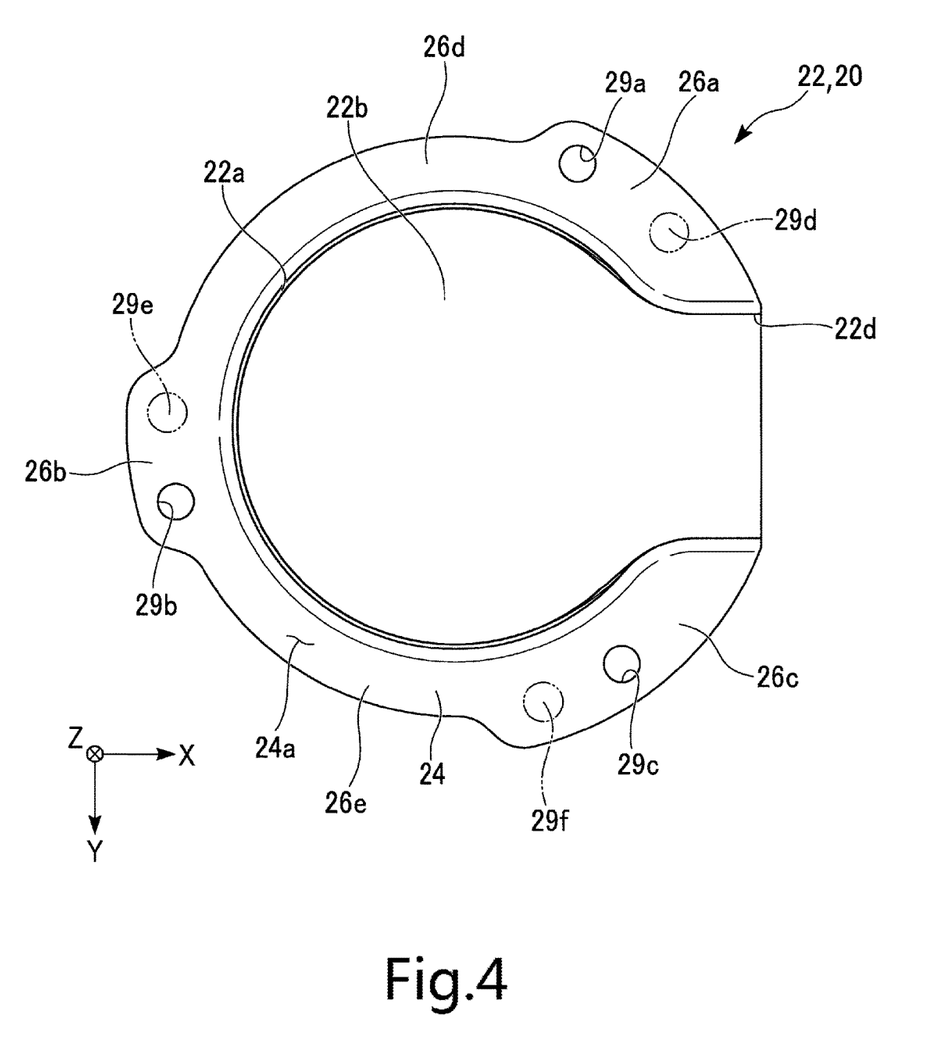
FIG. 4 is a bottom view of a motor cover according to the above embodiment of the present invention.
Figure 5:
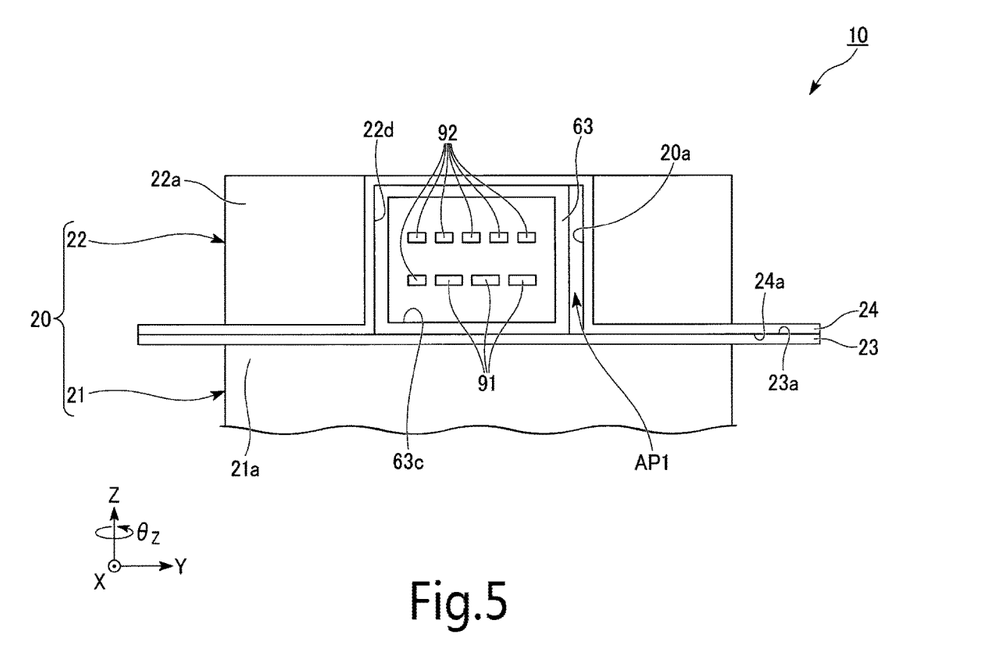
FIG. 5 is a front view of the motor according to the above embodiment of the present invention.

FIG. 1 is a cross-sectional view of a motor 10 according to an embodiment of the present invention. FIG. 2 is a perspective view of the motor 10. FIG. 3 is a plan view of the motor 10. FIG. 4 is a bottom view illustrating a motor cover 22. FIG. 5 is a front view of the motor 10. In FIG. 2, a busbar unit 60 is not shown.

The term "plan view" as used in the following description refers to a view of a given target object as viewed from directly above. The term "bottom view" as used in the following description refers to a view of a given target object as viewed from directly below. The term "front view" as used herein refers to a view of a given target object as viewed from a +x side toward a −x side.

In this embodiment, the motor 10 is a brushless motor. Referring to FIG. 1, the motor 10 includes a case 20, a rotor 30 including a shaft 31, a stator 40, bearings, a control unit 70, the busbar unit 60, and O rings. The bearings include a lower bearing 51 and an upper bearing 52. The O rings include a lower O ring 81 and an upper O ring 82.

The case 20 is arranged to accommodate the rotor 30, the stator 40, and the busbar unit 60. The case 20 includes a housing 21 and the motor cover 22. The housing 21 is a tubular or substantially member, and is arranged to hold the stator 40 and the lower bearing 51. In this embodiment, the housing 21 is in the shape of a cylinder or substantially cylinder having multiple shoulders and opening at both ends. That is, the housing 21 is arranged to hold the stator 40, and has an opening portion 21e at a top thereof. A material of the housing 21 is, for example, a metal. Note that the shape of the housing 21 is not limited to the above-described shape, but may alternatively be any other desirable shape. Also note that the material of the housing 21 is not limited to metals, but may alternatively be any other desirable material.

The housing 21 includes a housing tubular portion 21g and a housing flange portion 23. The housing tubular portion 21g is arranged to surround a radially outer side of the stator 40. The housing tubular portion 21g includes a busbar unit insertion portion 21a, a stator holding portion 21b, a lower bearing holding portion 21c, and an oil seal holding portion 21d. The busbar unit insertion portion 21a, the stator holding portion 21b, the lower bearing holding portion 21c, and the oil seal holding portion 21d are arranged in the order named from the upper side (i.e., the +z side) toward the lower side (i.e., the −z side) along the axial direction (i.e., the z-axis direction). The busbar unit insertion portion 21a, the stator holding portion 21b, the lower bearing holding portion 21c, and the oil seal holding portion 21d are all cylindrical and are concentric with one another. Of these portions, the busbar unit insertion portion 21a has the greatest diameter, followed by the stator holding portion 21b, the lower bearing holding portion 21c, and the oil seal holding portion 21d in the order named.

The busbar unit insertion portion 21a is arranged to surround a lower end portion of the busbar unit 60, i.e., an end portion of the busbar unit 60 on the −z side, from radially outside. That is, the lower end portion of the busbar unit 60 is arranged inside of the housing 21.

An inside surface of the stator holding portion 21b is fitted to an outside surface of the stator 40, more specifically, an outside surface of a core back portion 41, which will be described below. The housing 21 is thus able to hold the stator 40. The lower bearing holding portion 21c is arranged to hold the lower bearing 51. In this embodiment, the lower bearing 51 is fitted to an inside of the lower bearing holding portion 21c. An oil seal 80 is held inside of the oil seal holding portion 21d.

The housing flange portion 23 is arranged to extend radially outward from an outer circumferential surface of the housing tubular portion 21g. In this embodiment, the housing flange portion 23 is arranged to extend radially outward from an upper end portion of the busbar unit insertion portion 21a, i.e., an end portion of the busbar unit insertion portion 21a on the +z side.

Referring to FIG. 3, the housing flange portion 23 includes housing-side fitting portions 25a, 25b, and 25c and housing-side joining portions 25d, 25e, and 25f. That is, the housing 21 includes the housing-side fitting portions 25a, 25b, and 25c and the housing-side joining portions 25d, 25e, and 25f.

Each of the housing-side fitting portions 25a, 25b, and 25c is arranged to extend radially outward from the outer circumferential surface of the housing tubular portion 21g. Radially outer ends of the housing-side fitting portions 25a, 25b, and 25c are arranged radially outward of the housing-side joining portions 25d to 25f.

The housing-side fitting portions 25a, 25b, and 25c are arranged along a circumferential direction. In other words, the housing 21 includes a plurality of housing-side fitting portions arranged along the circumferential direction. In the present embodiment, the housing-side fitting portions include the housing-side fitting portions 25a, 25b, and 25c, which are three in number. That is, the housing 21 includes three or more housing-side fitting portions arranged along the circumferential direction.

The housing-side fitting portion 25a includes a housing-side fixing hole portion 28a and a housing-side crimping portion 28d. The housing-side fitting portion 25b includes a housing-side fixing hole portion 28b and a housing-side crimping portion 28e. The housing-side fitting portion 25c includes a housing-side fixing hole portion 28c and a housing-side crimping portion 28f.

The housing-side fixing hole portions 28a, 28b, and 28c are arranged to pass through the housing-side fitting portions 25a, 25b, and 25c, respectively, in the axial direction (i.e., the z-axis direction). Fixing members are passed through the housing-side fixing hole portions 28a, 28b, and 28c to fix the motor 10 to another product. The housing-side fixing hole portions 28a, 28b, and 28c are, for example, holes in which the fixing members are arranged to fix the motor 10. Each of the housing-side fixing hole portions 28a, 28b, and 28c is a circumferentially elongated hole. In this embodiment, the fixing members are screws, and are passed through the housing-side fixing hole portions 28a, 28b, and 28c.

The housing-side crimping portions 28d, 28e, and 28f are portions to be crimped to cover-side crimping portions 29d, 29e, and 29f, respectively, which will be described below, in the axial direction (i.e., the z-axis direction). Referring to FIG. 1, the housing-side crimping portion 28e as crimped at the housing-side fitting portion 25b projects upward. The same is true of each of the housing-side crimping portions 28d and 28f.

Referring to FIG. 3, each of the housing-side joining portions 25d, 25e, and 25f is arranged to extend radially outward from the outer circumferential surface of the housing tubular portion 21g. Each of the housing-side joining portions 25d, 25e, and 25f is arranged to extend in the circumferential direction. Each of the housing-side joining portions 25d, 25e, and 25f is arranged to join circumferentially adjacent ones of the housing-side fitting portions 25a, 25b, and 25c to each other. Specifically, the housing-side joining portion 25d is arranged to join the housing-side fitting portions 25a and 25b to each other. The housing-side joining portion 25e is arranged to join the housing-side fitting portions 25b and 25c to each other. The housing-side joining portion 25f is arranged to join the housing-side fitting portions 25c and 25a to each other.

Referring to FIG. 1, the motor cover 22 is fitted to an upper side of the housing 21. The motor cover 22 is arranged to cover an upper side of the stator 40. A material of the motor cover 22 is, for example, a metal. The motor cover 22 includes a cover tubular portion 22a, a cover top portion 22b, a cover flange portion 24, and a connector cover portion 27. Note that the motor cover 22 may alternatively be made of a material other than metals.

The cover tubular portion 22a is open downwardly. The cover tubular portion 22a is arranged to surround a radially outer side of the busbar unit 60, more specifically, a radially outer side of an upper end portion of a holder body portion 62, which will be described below.

The cover top portion 22b is defined continuously with an upper end portion of the cover tubular portion 22a. In this embodiment, the cover top portion 22b is in the shape of a plate or substantially plate. The cover top portion 22b is arranged to close an upper opening of the holder body portion 62. A cover lower surface 22c, which is a lower surface of the cover top portion 22b, is arranged to be in contact with the upper O ring 82 over the entire circumferential extent thereof.

Referring to FIGS. 1 and 4, the cover flange portion 24 is arranged to extend radially outward from a lower end portion of the cover tubular portion 22a. Referring to FIG. 4, the cover flange portion 24 includes cover-side fitting portions 26a, 26b, and 26c and cover-side joining portions 26d and 26e. That is, the motor cover 22 includes the cover-side fitting portions 26a, 26b, and 26c and the cover-side joining portions 26d and 26e.

Each of the cover-side fitting portions 26a, 26b, and 26c is arranged to extend radially outward from an outer circumferential surface of the cover tubular portion 22a. Radially outer ends of the cover-side fitting portions 26a, 26b, and 26c are arranged radially outward of the cover-side joining portions 26d and 26e.

The cover-side fitting portions 26a, 26b, and 26c are arranged along the circumferential direction. In other words, the motor cover 22 includes a plurality of cover-side fitting portions arranged along the circumferential direction. In this embodiment, the cover-side fitting portions include the cover-side fitting portions 26a, 26b, and 26c, which are three in number. That is, the motor cover 22 includes three or more cover-side fitting portions arranged along the circumferential direction.

The cover-side fitting portion 26a includes a cover-side fixing hole portion 29a and the cover-side crimping portion 29d. The cover-side fitting portion 26b includes a cover-side fixing hole portion 29b and the cover-side crimping portion 29e. The cover-side fitting portion 26c includes a cover-side fixing hole portion 29c and the cover-side crimping portion 29f.

The cover-side fixing hole portions 29a, 29b, and 29c are arranged to pass through the cover-side fitting portions 26a, 26b, and 26c, respectively, in the axial direction (i.e., the z-axis direction). The fixing members are arranged in the cover-side fixing hole portions 29a, 29b, and 29c to fix the motor 10 to the other product. The cover-side fixing hole portions 29a, 29b, and 29c are, for example, holes in which the fixing members are arranged to fix the motor 10. In this embodiment, the fixing members are screws, and are passed through the cover-side fixing hole portions 29a, 29b, and 29c.

The cover-side fixing hole portion 29a is arranged to axially overlap with the housing-side fixing hole portion 28a. The cover-side fixing hole portion 29b is arranged to axially overlap with the housing-side fixing hole portion 28b. The cover-side fixing hole portion 29c is arranged to axially overlap with the housing-side fixing hole portion 28c. In other words, the cover-side fixing hole portion 29a and the housing-side fixing hole portion 28a are arranged to overlap with each other in a plan view. The cover-side fixing hole portion 29b and the housing-side fixing hole portion 28b are arranged to overlap with each other in a plan view. The cover-side fixing hole portion 29c and the housing-side fixing hole portion 28c are arranged to overlap with each other in a plan view. The screws used to fix the motor 10 are passed through both the cover-side fixing hole portions 29a, 29b, and 29c and the housing-side fixing hole portions 28a, 28b, and 28c, which axially overlap with each other.

The cover-side crimping portions 29d, 29e, and 29f are crimped to the housing-side crimping portions 28d, 28e, and 28f, respectively, in the axial direction (i.e., the z-axis direction). Referring to FIG. 1, the cover-side crimping portion 29e as crimped at the cover-side fitting portion 26b projects upward. The same is true of each of the cover-side crimping portions 29d and 29f. Specifically, the cover-side crimping portions 29d and 29f as crimped at the cover-side fitting portions 26a and 26c, respectively, project upward.

Each of the cover-side joining portions 26d and 26e is arranged to extend radially outward from the outer circumferential surface of the cover tubular portion 22a. Each of the cover-side joining portions 26d and 26e is arranged to extend in the circumferential direction. Each of the cover-side joining portions 26d and 26e is arranged to join circumferentially adjacent ones of the cover-side fitting portions 26a, 26b, and 26c to each other. Specifically, the cover-side joining portion 26d is arranged to join the cover-side fitting portions 26a and 26b to each other. The cover-side joining portion 26e is arranged to join the cover-side fitting portions 26b and 26c to each other.

The housing-side fitting portions 25a, 25b, and 25c are fixed to the cover-side fitting portions 26a, 26b, and 26c, respectively, as a result of the housing-side crimping portions 28d, 28e, and 28f and the cover-side crimping portions 29d, 29e, and 29f being respectively crimped to each other in the axial direction (i.e., the z-axis direction) as described above. As a result, the housing flange portion 23 is fitted onto the cover flange portion 24, so that the housing 21 is joined to the motor cover 22. A housing flange upper surface 23a is an upper surface of the housing flange portion 23. A cover flange lower surface 24a is a lower surface of the cover flange portion 24. Referring to FIG. 5, the housing flange upper surface 23a is arranged to be in contact with the cover flange lower surface 24a to fix the housing 21 to the motor cover 22.

Referring to FIG. 2, the connector cover portion 27 is arranged to extend in a direction (i.e., the x-axis direction) in which a connector portion 63, which will be described below, projects from the cover tubular portion 22a. The connector cover portion 27 includes side wall portions 27a and 27b and a top plate portion 27c. Each of the side wall portions 27a and 27b and the top plate portion 27c is arranged to extend in the direction (i.e., the x-axis direction) in which the connector portion 63 projects from the cover tubular portion 22a. The side wall portions 27a and 27b are arranged on opposite circumferential sides of the connector portion 63. The top plate portion 27c is arranged to join an upper end portion of the side wall portion 27a and an upper end portion of the side wall portion 27b to each other. The top plate portion 27c is arranged to be flush with the cover top portion 22b.

Referring to FIGS. 2 and 4, the motor cover 22 includes a cover recessed portion 22d recessed upward from a lower end of the motor cover 22. The cover recessed portion 22d is defined by the side wall portions 27a and 27b and the top plate portion 27c.

Referring to FIGS. 1 and 2, the case 20 includes a case through hole 20a arranged to open into a space outside of the case 20. In this embodiment, the case through hole 20a is a hole through which the connector portion 63, which will be described below, is passed. The case through hole 20a is arranged in at least one of the housing 21 and the motor cover 22. The case through hole 20a is arranged to open radially outwardly. The case through hole 20a is arranged between the motor cover 22 and the housing 21 in the axial direction (i.e., the z-axis direction).

Accordingly, the case through hole 20a is defined as a result of the motor cover 22 and the housing 21 being fitted onto each other. This makes it easier for an operator or the like to pass the connector portion 63 through the case through hole 20a when assembling the motor 10, which facilitates assembly of the motor 10.

A lower opening of the cover recessed portion 22d is closed by the housing flange portion 23 to define the case through hole 20a. That is, the cover recessed portion 22d defines a portion of the case through hole 20a. Accordingly, the motor cover 22 is able to surround an upper portion of a busbar holder 61. This contributes to reducing the axial dimension (i.e., the dimension as measured in the z-axis direction) of a portion of the busbar holder 61 which is inserted into the opening portion 21e. This in turn makes it easier for the operator or the like to arrange the busbar holder 61 into the housing 21 through the opening portion 21e when assembling the motor 10.

In FIG. 5, the shape of the case through hole 20a in a front view is substantially rectangular. Note, however, that the case through hole 20a may alternatively be arranged to have any other desirable shape.

Referring to FIG. 1, the rotor 30 includes the shaft 31, a rotor core 32, and a rotor magnet 33. The shaft 31 has the central axis J extending in the vertical direction (i.e., the z-axis direction) as a center thereof. The shaft 31 is supported by the lower and upper bearings 51 and 52 to be rotatable about the central axis J (i.e., in a $\pm\theta_z$ direction). A lower end portion of the shaft 31, i.e., an end portion of the shaft 31 on the −z side, is arranged to project out of the housing 21. The oil seal 80 is arranged inside of the oil seal holding portion 21d. The oil seal 80 is arranged around the shaft 31.

The rotor core 32 is arranged to surround the shaft 31 while extending in the circumferential direction (i.e., in the $\theta_z$ direction), and is fixed to the shaft 31. The rotor magnet 33 is fixed to an outside surface of the rotor core 32, the outside surface of the rotor core 32 extending in the circumferential direction. The rotor core 32 and the rotor magnet 33 are arranged to rotate together with the shaft 31.

The stator 40 is arranged radially outside of the rotor 30. The stator 40 is arranged to surround the rotor 30 while extending in the circumferential direction (i.e., the $\theta_z$ direction). The stator 40 includes the core back portion 41, a plurality of tooth portions 42, coils 43, and an insulating member 44.

The core back portion 41 is cylindrical or substantially cylindrical and coaxial with the shaft 31. Each tooth portion 42 is arranged to extend from an inside surface of the core back portion 41 toward the shaft 31. The tooth portions 42 are arranged at regular intervals in the circumferential direction on the inside surface of the core back portion 41.

The insulating member 44 is fitted to each tooth portion 42. Each coil 43 is defined by winding a conductor wire 43a. Each coil 43 is arranged around a corresponding one of the tooth portions 42 with the insulating member 44 intervening therebetween.

The lower bearing 51 is arranged on a lower side (i.e., the −z side) of the stator 40. The lower bearing 51 is held by the lower bearing holding portion 21c. The upper bearing 52 is arranged on an upper side (i.e., the +z side) of the stator 40. The upper bearing 52 is held by an upper bearing holding portion 65, which will be described below.

The lower and upper bearings 51 and 52 are arranged to support the shaft 31. In this embodiment, each of the lower and upper bearings 51 and 52 is a ball bearing. Note, however, that each of the lower and upper bearings 51 and 52 is not limited to any particular type, and may alternatively be a bearing of another type.

The oil seal 80 is a substantially annular or annular member. The oil seal 80 is made of, for example, a resin material. The oil seal 80 is arranged inside of the oil seal holding portion 21d, and is fitted to the shaft 31 while extending in the circumferential direction (i.e., the $\theta_z$ direction) around the shaft 31. The oil seal 80 contributes to preventing water, an oil, or the like from entering into the housing 21 through a gap between the oil seal holding portion 21d and the shaft 31. Note that the structure and material of the oil seal 80 are not limited to the above-described structure and material.

The control unit 70 is arranged to control drive of the motor 10. The control unit 70 includes a circuit board 71, rotation sensors 72, a sensor magnet holding member 73a, and a sensor magnet 73b. That is, the motor 10 includes the circuit board 71, the rotation sensors 72, the sensor magnet holding member 73a, and the sensor magnet 73b.

The circuit board 71 is arranged on an axially upper side (i.e., the +z side) of the shaft 31. The circuit board 71 is arranged between the upper bearing 52 and the motor cover 22 in the axial direction (i.e., the z-axis direction). A circuit board upper surface 71a is an upper surface of the circuit board 71. A circuit board lower surface 71b is a lower surface of the circuit board 71. Each of the circuit board upper surface 71a and the circuit board lower surface 71b is preferably arranged to be perpendicular to the axial direction (i.e., the z-axis direction).

The circuit board 71 is supported by upper end portions of a plurality of circuit board support portions 67, which will be described below. The circuit board 71 is thus held by the busbar unit 60. A printed circuit (not shown) is arranged on at least one of the circuit board upper surface 71a and the circuit board lower surface 71b. The circuit board 71 is arranged to output motor drive signals.

The sensor magnet holding member 73a is an annular or substantially member. The sensor magnet holding member 73a includes a hole defined in a center thereof. A decreased diameter portion of an upper end portion of the shaft 31, i.e., of an end portion of the shaft 31 on the +z side, is fitted into the central hole of the sensor magnet holding member 73a. The sensor magnet holding member 73a is thus positioned and fitted to the shaft 31. The sensor magnet holding member 73a is arranged to be rotatable together with the shaft 31.

The sensor magnet 73b is annular or substantially annular. In the sensor magnet 73b, north and south poles are arranged alternately in the circumferential direction. The sensor magnet 73b is fitted to a radially outer end portion of the sensor magnet holding member 73a. The sensor magnet 73b is thus fixed to the shaft 31 through the sensor magnet holding member 73a. The sensor magnet 73b is arranged on the upper side of the stator 40. The sensor magnet 73b is arranged on the upper side of the upper bearing 52.

The rotation sensors 72 are attached to the circuit board 71. Thus, when the plurality of rotation sensors 72 are attached to the circuit board 71, each rotation sensor 72 can be disposed on the circuit board 71 with high positional accuracy. The operator or the like can arrange the circuit board 71 on the busbar unit 60 after the rotation sensors 72 are attached to the circuit board 71. This facilitates the assembly of the motor 10.

In this embodiment, the rotation sensors 72 are attached to the circuit board lower surface 71b. The circuit board 71 is held by the busbar unit 60. Therefore, the rotation sensors 72 are held by the busbar unit 60. Each rotation sensor 72 is arranged axially (i.e., in the z-axis direction) opposite to the sensor magnet 73b. The rotation sensor 72 is arranged to detect a change in magnetic flux of the sensor magnet 73b. In this embodiment, three rotation sensors 72 are attached to the circuit board 71. The rotation sensors 72 are arranged at regular intervals along the circumferential direction. Note that the rotation sensors 72 are not limited to any particular type, and Hall elements, resolvers, or the like, for example, may be used as the rotation sensors 72.

The busbar unit 60 is a unit to supply electric drive currents to the stator 40. The busbar unit 60 is arranged on the upper side of the stator 40. The busbar unit 60 includes the busbar holder 61, phase busbars 91, and sensor busbars 92.

The busbar holder 61 is arranged to hold the phase busbars 91 and the sensor busbars 92. The busbar holder 61 is made of, for example, a resin. The busbar holder 61 is arranged at the opening portion 21e. The motor cover 22 includes the cover tubular portion 22a. The upper portion of the busbar holder 61 is inserted in the cover tubular portion 22a. A lower portion of the busbar holder 61 is inserted in the busbar unit insertion portion 21a of the housing 21.

The busbar holder 61 is preferably made of a resin having an insulating property. The busbar holder 61 is preferably produced as a single monolithic member by an injection molding process. The busbar holder 61 includes the holder body portion 62, the connector portion 63, a holder bottom portion 66, the upper bearing holding portion 65, and the plurality of circuit board support portions 67. Note that the busbar holder 61 may alternatively be made of any other desirable material having the insulating property. Also note that the busbar holder 61 may alternatively be defined by a plurality of members.

The holder body portion 62 is tubular, and is arranged to surround the central axis J while extending in the circumferential direction (i.e., the $\theta_z$ direction). In this embodiment, the holder body portion 62 is cylindrical. At least a portion of the holder body portion 62 is arranged radially inside of the opening portion 21e. In more detail, a lower end portion of the holder body portion 62 is arranged at the opening portion 21e. The holder body portion 62 is arranged to surround an upper end portion of the rotor 30 and an upper end portion of the stator 40 while extending in the circumferential direction. That is, a portion of an upper portion of the rotor 30 and a portion of an upper portion of the stator 40 are arranged in a lower portion of an interior space of the holder body portion 62.

A body portion upper surface 62c, which is an upper surface of the holder body portion 62, includes a groove portion 62f arranged to surround an upper opening of the holder body portion 62. The upper O ring 82 is fitted into the groove portion 62f. A body portion outside surface 62d is an outside surface of the holder body portion 62. An O ring holding portion 62e is defined in a lower portion of the body portion outside surface 62d. The lower O ring 81 is fitted into and held in the O ring holding portion 62e. The lower O ring 81 is arranged to be in contact with an inside surface of the housing 21 and the outside surface of the holder body portion 62 over the entire circumferential extent thereof. That is, the lower O ring 81 is arranged radially between the housing 21 and the holder body portion 62.

Accordingly, frictional forces occur between the lower O ring 81 and the inside surface of the housing 21 and between the lower O ring 81 and the outside surface of the holder body portion 62. This reduces the likelihood that the busbar unit 60 will be circumferentially displaced when the shaft 31 is rotated to adjust the positions of the rotation sensors 72 on the circuit board 71. This in turn allows the rotation sensors 72 to be arranged at predetermined desirable positions relative to the sensor magnet 73b.

The connector portion 63 is connected to an external power supply (now shown). The connector portion 63 is arranged to project radially outward (specifically, to the +x side) from the holder body portion 62. The connector portion 63 is arranged to project out of the case 20 through the case through hole 20a.

The connector portion 63 includes a joining portion 63a and a connector body portion 63b. The joining portion 63a is arranged to join the holder body portion 62 and the connector body portion 63b to each other. The joining portion 63a is arranged in the case through hole 20a. That is, at least a portion of the connector portion 63 is arranged in the case through hole 20a.

The connector body portion 63b is joined to a radially outer end portion of the joining portion 63a. In this embodiment, the connector body portion 63b is substantially in the shape of a hollow rectangular parallelepiped. The connector body portion 63b includes a power supply opening portion 63c, i.e., an opening portion used for the power supply, which opens radially outwardly. The phase busbars 91 and the sensor busbars 92 are arranged to project from a bottom surface of the power supply opening portion 63c. The connector body portion 63b is arranged to protrude out of the case 20. That is, the connector portion 63 includes a portion arranged to protrude out of the case 20.

In other words, at least a portion of the connector portion 63 is located outside of the case 20.

Referring to FIG. 5, a gap AP1 is defined circumferentially between the connector portion 63 and an edge of the case through hole 20a. Accordingly, the positions of the rotation sensors 72 can be adjusted relative to the sensor magnet 73b. A detailed description thereof will be given below.

The holder body portion 62 is cylindrical, and is arranged at the opening portion 21e of the housing 21. Accordingly, before the housing 21 is fixed to the motor cover 22, the holder body portion 62 is rotatable in the circumferential direction with respect to the housing 21. At least a portion of the connector portion 63 is arranged in the case through hole 20a. If the gap AP1 were not defined circumferentially between the connector portion 63 and the edge of the case through hole 20a, the circumferential position of the busbar holder 61 including the connector portion 63 would be uniquely determined by the position of the case through hole 20a. Therefore, it would be impossible to rotate the busbar holder 61 in the circumferential direction, and would be difficult to adjust the positions of the rotation sensors 72 held by the busbar holder 61 with respect to the sensor magnet 73b.

In contrast, according to this embodiment, the gap AP1 is defined circumferentially between the connector portion 63 and the edge of the case through hole 20a. This allows the busbar holder 61 to be rotated in the circumferential direction within the range of the gap AP1. This makes it possible to adjust the positions of the rotation sensors 72 held by the busbar holder 61 with respect to the sensor magnet 73b during the assembly of the motor 10.

Moreover, it is also made possible to adjust the circumferential positions of the rotation sensors 72 held by the busbar holder 61 with respect to the stator 40. In this embodiment, the rotation sensors 72 are arranged to detect changes in the magnetic flux of the sensor magnet 73b. The position of the rotor 30 with respect to the stator 40 is calculated based on the detected changes in the magnetic flux. Current switching control or the like for the motor 10 is performed based on the calculated position of the rotor 30.

Thus, the positions of the rotation sensors 72 relative to the sensor magnet 73b can be appropriately arranged to efficiently control the motor 10.

When the positions of the rotation sensors 72 relative to the sensor magnet 73b are adjusted, the busbar unit 60 is moved little by little in the circumferential direction with respect to the case 20, and the shaft 31 is caused to rotate for each circumferential position of the busbar unit 60 with respect to the case 20. Rotation of the shaft 31 causes changes in the magnetic flux of the sensor magnet 73b as detected by the rotation sensors 72. Based on the changes in the detected magnetic flux of the sensor magnet 73b, an appropriate arrangement of the rotation sensors 72 is determined. An example method of causing the rotation of the shaft 31 is to connect a shaft of another motor with the shaft 31 and rotate the shaft.

When the circumferential positions of the rotation sensors 72 held by the busbar holder 61 with respect to the stator 40 are adjusted, the busbar unit 60 is moved little by little in the circumferential direction with respect to the case 20. A method of optimizing the circumferential positions of the rotation sensors 72 with respect to the stator 40 has been described above. Specifically, the rotation sensors 72 detect the changes in the magnetic flux of the sensor magnet 73b. Based on the changes in the magnetic flux as detected by the rotation sensors 72, the position of the rotor 30 with respect to the stator 40 is calculated. This allows an appropriate arrangement of the positions of the rotation sensors 72 with respect to the stator 40.

According to this embodiment, the connector portion 63 is arranged to project out of the case 20 through the case through hole 20a. This enables the operator or the like to hold the connector portion 63 and rotate the busbar holder 61 in the circumferential direction. Accordingly, it is easy for the operator or the like to rotate the busbar holder 61 to adjust the positions of the rotation sensors 72 relative to the sensor magnet 73b during the assembly of the motor 10.

The external power supply is connected to the connector portion 63. In this embodiment, the connector portion 63 is a protruding portion arranged to protrude out of the case 20. Accordingly, it is easy to connect the external power supply to the connector portion 63.

The connector portion 63 is passed through the case through hole 20a. The case through hole 20a is arranged to open radially outwardly. Thus, the case through hole 20a is defined by the housing 21 and the motor cover 22. This makes it easier for the operator or the like to manage the phase busbars 91 and the sensor busbars 92 than in the case where the case through hole 20a is defined in the cover top portion 22b.

The housing 21 is fixed to the motor cover 22 with the housing flange upper surface 23a in contact with the cover flange lower surface 24a. Accordingly, when adjusting the positions of the rotation sensors 72 by rotating the motor cover 22 together with the busbar unit 60, the operator or the like can easily rotate the motor cover 22 with respect to the housing 21. The circumferential position of the motor cover 22 can be varied as far as the cover-side fixing hole portions 29a, 29b, and 29c axially (i.e., when viewed in the z-axis direction) overlap with the housing-side fixing hole portions 28a, 28b, and 28c, respectively, which are elongated holes, and the fixing members can be passed through the cover-side fixing hole portions 29a, 29b, and 29c and the housing-side fixing hole portions 28a, 28b, and 28c.

The position of the gap AP1 varies depending on the positions of the rotation sensors 72 relative to the sensor magnet 73b. In FIG. 5, the connector portion 63 is in contact with a side edge of the case through hole 20a on one circumferential side (i.e., a $-\theta_z$ side). The gap AP1 is arranged on an opposite circumferential side (i.e., a $+\theta_z$ side) of the connector portion 63. Note that the connector portion 63 may alternatively be arranged to be in contact with a side edge of the case through hole 20a on the opposite circumferential side (i.e., the $+\theta_z$ side), with the gap AP1 being arranged on the one circumferential side (i.e., the $-\theta_z$ side) of the connector portion 63. Also note that the connector portion 63 may alternatively be arranged to be out of contact with the side edges of the case through hole 20a on both circumferential sides, with gaps AP1 being defined on both circumferential sides of the connector portion 63.

Referring to FIG. 3, the holder bottom portion 66 is arranged to extend radially inward from an inner circumferential surface of the holder body portion 62. The holder bottom portion 66 is arranged to join the holder body portion 62 and the upper bearing holding portion 65 to each other. The holder bottom portion 66 includes bottom portion through holes 66a each of which is arranged to pass through the holder bottom portion 66 in the axial direction (i.e., the z-axis direction). In FIG. 3, the number of bottom portion through holes 66a included in the holder bottom portion 66 is three. The bottom portion through holes 66a are arranged along the circumferential direction.

Referring to FIG. 1, a connection wire 45 to connect the stator 40 to the corresponding phase busbar 91 is passed through each bottom portion through hole 66a. Referring to FIG. 3, each bottom portion through hole 66a is arranged to extend in the circumferential direction. This reduces the likelihood that the connection wire 45 will come into contact with an edge of the bottom portion through hole 66a when the busbar holder 61 is rotated in the circumferential direction. This contributes to preventing damage to the connection wire 45 when the busbar holder 61 is rotated in the circumferential direction to adjust the positions of the rotation sensors 72 relative to the sensor magnet 73b.

Each bottom portion through hole 66a is arranged to axially (i.e., when viewed in the z-axis direction) overlap with a plurality of coil connection portions 93 of the corresponding phase busbar 91, which will be described below. In FIG. 3, each bottom portion through hole 66a axially overlaps with two of the coil connection portions 93.

The upper bearing holding portion 65 is arranged radially inside of the holder body portion 62. The upper bearing holding portion 65 is arranged to hold the upper bearing 52. This makes it possible to precisely rotate the busbar holder 61 about the shaft 31 (i.e., in the $\pm\theta_z$ direction). Thus, the positions of the rotation sensors 72 relative to the sensor magnet 73b can be precisely adjusted.

Each circuit board support portion 67 is arranged to project upward from an upper surface of the upper bearing holding portion 65. The upper end portion of each circuit board support portion 67 is arranged to support the circuit board 71.

The housing 21 is fixed to the motor cover 22 by crimping. As a result, a downward force is exerted on the busbar holder 61 by the cover top portion 22b through the upper O ring 82. The busbar holder 61 is held axially (i.e., in the z-axis direction) between the housing 21 and the motor cover 22, and is thus fixed to the case 20. Therefore, the busbar holder 61 is not rotatable in the circumferential direction in a situation in which the housing 21 is fixed to the motor cover 22.

The phase busbars 91 illustrated in FIG. 5 are electrically connected to the stator 40 to supply the electric drive currents from the external power supply or the like to the stator 40. In this embodiment, the number of phase busbars 91 is more than one. In FIG. 5, the number of phase busbars 91 included in the motor 10 is three. Referring to FIG. 1, one end of each phase busbar 91 is arranged to project from the bottom surface of the power supply opening portion 63c of the connector portion 63. The external power supply is connected to this protruding end of the phase busbar 91.

Referring to FIG. 3, each of the plurality of phase busbars 91 includes the coil connection portions 93. The coil connection portions 93 are provided at an opposite end of each phase busbar 91. In this embodiment, the number of coil connection portions 93 provided in each phase busbar 91 is two. Each coil connection portion 93 is arranged to project from an inside surface of the holder body portion 62.

Referring to FIG. 1, the coil connection portions 93 are electrically connected to the coils 43 through the connection wires 45. The phase busbars 91 are thus electrically connected to the stator 40.

Each sensor busbar 92 is partially buried in the busbar holder 61, and is thus held by the busbar holder 61. The sensor busbar 92 is arranged to electrically connect the external power supply (not shown) to the circuit board 71. As described above, the circuit board 71 has the rotation sensors 72 attached thereto. Thus, the sensor busbars 92 are electrically connected to the rotation sensors 72.

Referring to FIGS. 3 and 5, the plurality of sensor busbars 92 are arranged on the busbar holder 61. In FIGS. 3 and 5, the number of sensor busbars 92 is six. One end of each sensor busbar 92 is arranged to project from the bottom surface of the power supply opening portion 63c. The external power supply is connected to this protruding end of the sensor busbar 92.

Referring to FIGS. 1 and 3, each of the plurality of sensor busbars 92 includes a circuit board connection terminal 94. The circuit board connection terminal 94 is provided at an opposite end of the sensor busbar 92. In this embodiment, only one circuit board connection terminal 94 is provided in each sensor busbar 92. Each circuit board connection terminal 94 is arranged to project from the inside surface of the holder body portion 62. The circuit board connection terminal 94 is fixed to the circuit board upper surface 71a. Each sensor busbar 92 is thus electrically connected to the circuit board 71.

The busbar holder 61 is arranged to hold the sensor busbars 92. Each sensor busbar 92 is arranged to radially overlap with the case through hole 20a. This contributes to reducing the axial dimension (i.e., the dimension as measured in the z-axis direction) of the busbar holder 61, allowing miniaturization of the motor 10.

The motor 10 is connected to the external power supply through the connector portion 63. The connector portion 63 includes the power supply opening portion 63c. The phase busbars 91 and the sensor busbars 92 are arranged to project from the bottom surface of the power supply opening portion 63c, and are electrically connected to the external power supply. Thus, electric drive currents are supplied from the external power supply to the coils 43 and the rotation sensors 72 through the phase busbars 91 and the sensor busbars 92, respectively. The rotational position of the rotor 30 is calculated based on the changes in the magnetic flux detected by the rotation sensors 72. The electric drive currents supplied to the coils 43 are controlled in accordance with the calculated rotational position of the rotor 30. Once the electric drive currents are supplied to the coils 43, a torque is produced between the rotor 30 and the stator 40. This torque causes the rotor 30 including the shaft 31 to rotate relative to the stator 40. The motor 10 thus obtains a rotational driving force.

Note that the present invention is not limited to the above-described embodiment. In the following description, members or portions that have their equivalents in the embodiment described above are denoted appropriately by the same reference numerals as those of their equivalents in the embodiment described above, and descriptions of such members or portions may be omitted.

The case through hole 20a may be defined at any desirable position in the case 20. For example, the case through hole 20a may be defined in only the housing 21 or only the motor cover 22, or portions of the case through hole 20a may be defined in both the housing 21 and the motor cover 22.

Figure 6:
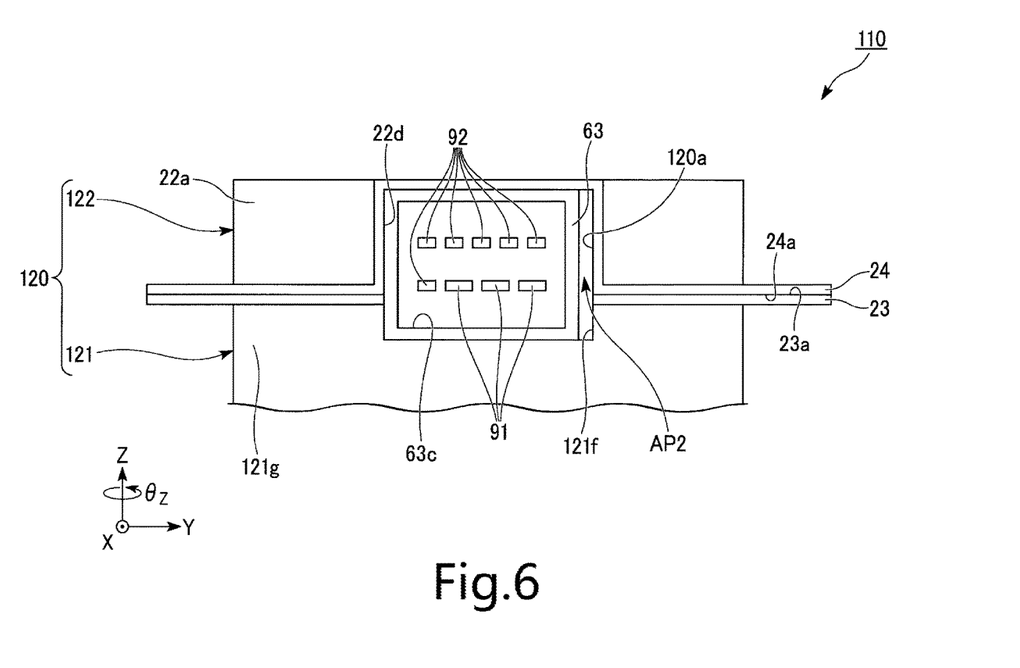
FIG. 6 is a front view of a motor according to another embodiment of the present invention.

FIG. 6 is a front view of a motor 110 according to another embodiment of the present invention. Referring to FIG. 6, the motor 110 includes a case 120. The case 120 includes a housing 121 and a motor cover 122. The housing 121 includes a housing tubular portion 121g and a housing flange portion 23. The housing tubular portion 121g includes a housing recessed portion 121f. The housing recessed portion 121f is recessed downward from an upper end of the housing 121.

The case 120 includes a case through hole 120a. A connector portion 63 is passed through the case through hole 120a. A gap AP2 is defined circumferentially between the connector portion 63 and an edge of the case through hole 120a. At least a portion of the case through hole 120a is defined in the housing 121. A lower end of the case through hole 120a is arranged at a level lower than that of the housing flange portion 23. Accordingly, the housing flange portion 23 is arranged to extend radially outward from an upper end portion of the housing 121. Thus, the housing 121 of the motor 110 has a simplified structure.

A cover recessed portion 22d is axially (i.e., in the z-axis direction) joined to the housing recessed portion 121f to define the case through hole 120*a*. That is, the housing recessed portion 121*f* defines a portion of the case through hole 120*a*.

Accordingly, by disposing the connector portion 63 in the housing recessed portion 121*f* and inserting a busbar unit 60 into the housing 121, an operator or the like is able to move the connector portion 63 in the circumferential direction inside of the housing recessed portion 121*f*. This arrangement allows the busbar unit 60 to be rotated within the range of the gap AP2, even without the motor cover 122 being placed on the housing 121, to adjust the positions of rotation sensors 72. The other features of the motor 110 are substantially the same as the corresponding features of the motor 10 illustrated in FIGS. 1 to 5, and a description thereof is omitted.

Figure 7:
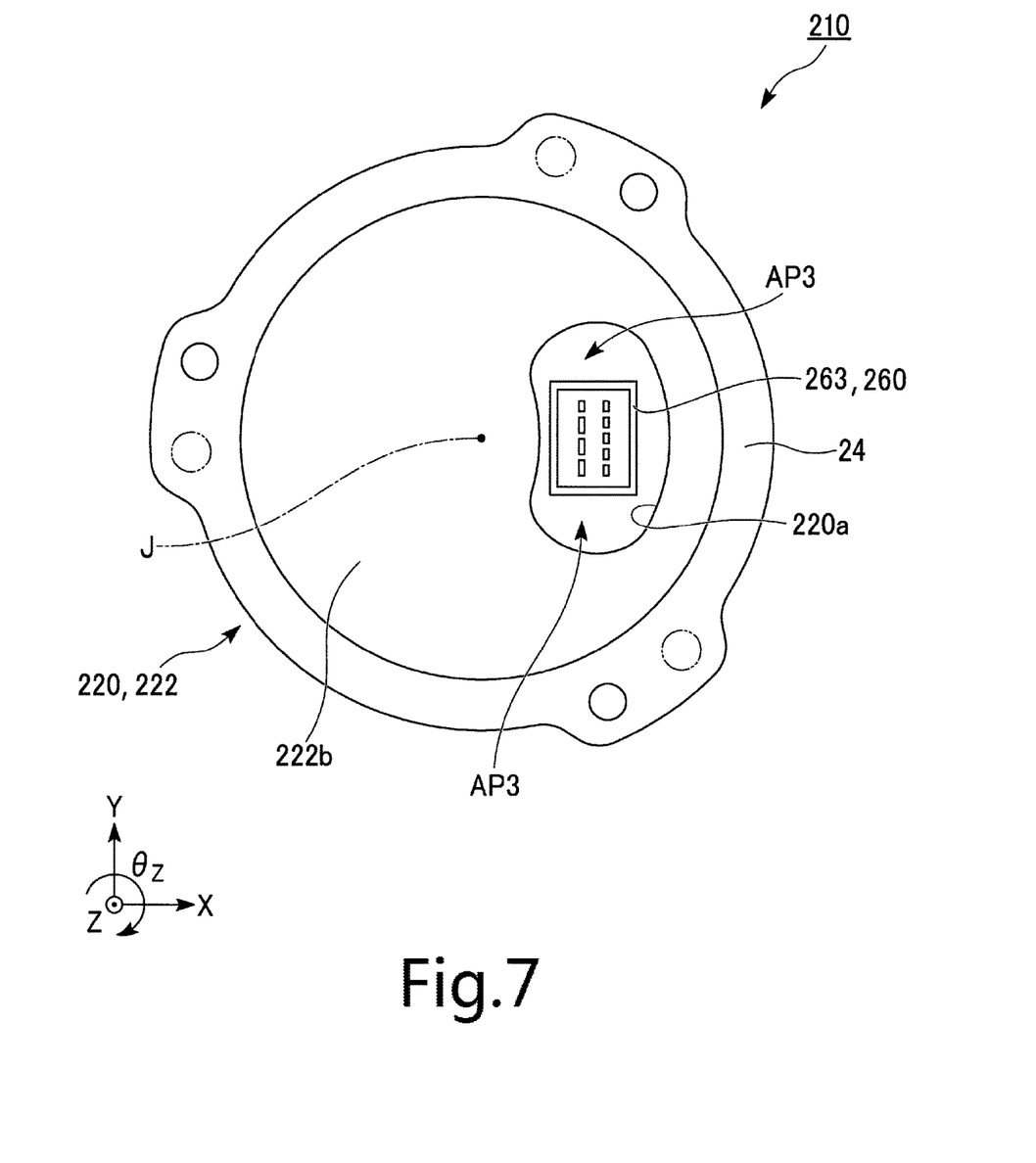
FIG. 7 is a plan view of a motor according to yet another embodiment of the present invention.

FIG. 7 is a plan view of a motor 210 according to yet another embodiment of the present invention. Referring to FIG. 7, the motor 210 includes a case 220 and a busbar unit 260. The case 220 includes a motor cover 222. The motor cover 222 includes a cover top portion 222*b*.

The case 220 includes a case through hole 220*a*. The case through hole 220*a* is defined in the cover top portion 222*b*. The case through hole 220*a* is arranged to pass through the cover top portion 222*b* in the axial direction, and is open upwardly. The case through hole 220*a* is arranged to extend in the circumferential direction. The busbar unit 260 includes a connector portion 263.

The connector portion 263 is arranged to extend upward from a holder body portion 62 (not shown in FIG. 7). The connector portion 263 is arranged to pass through the case through hole 220*a* and project upward above the motor cover 222. The connector portion 263 is arranged radially outward of a central axis J.

A gap AP3 is defined circumferentially between the connector portion 263 and an edge of the case through hole 220*a*. Accordingly, before a housing 21 and the motor cover 222 are fixed to each other, the busbar unit 260 can be rotated in the circumferential direction to adjust the positions of rotation sensors 72 relative to a sensor magnet 73*b*. The other features of the motor 210 are substantially the same as the corresponding features of the motor 10 illustrated in FIGS. 1 to 5.

Figure 8:
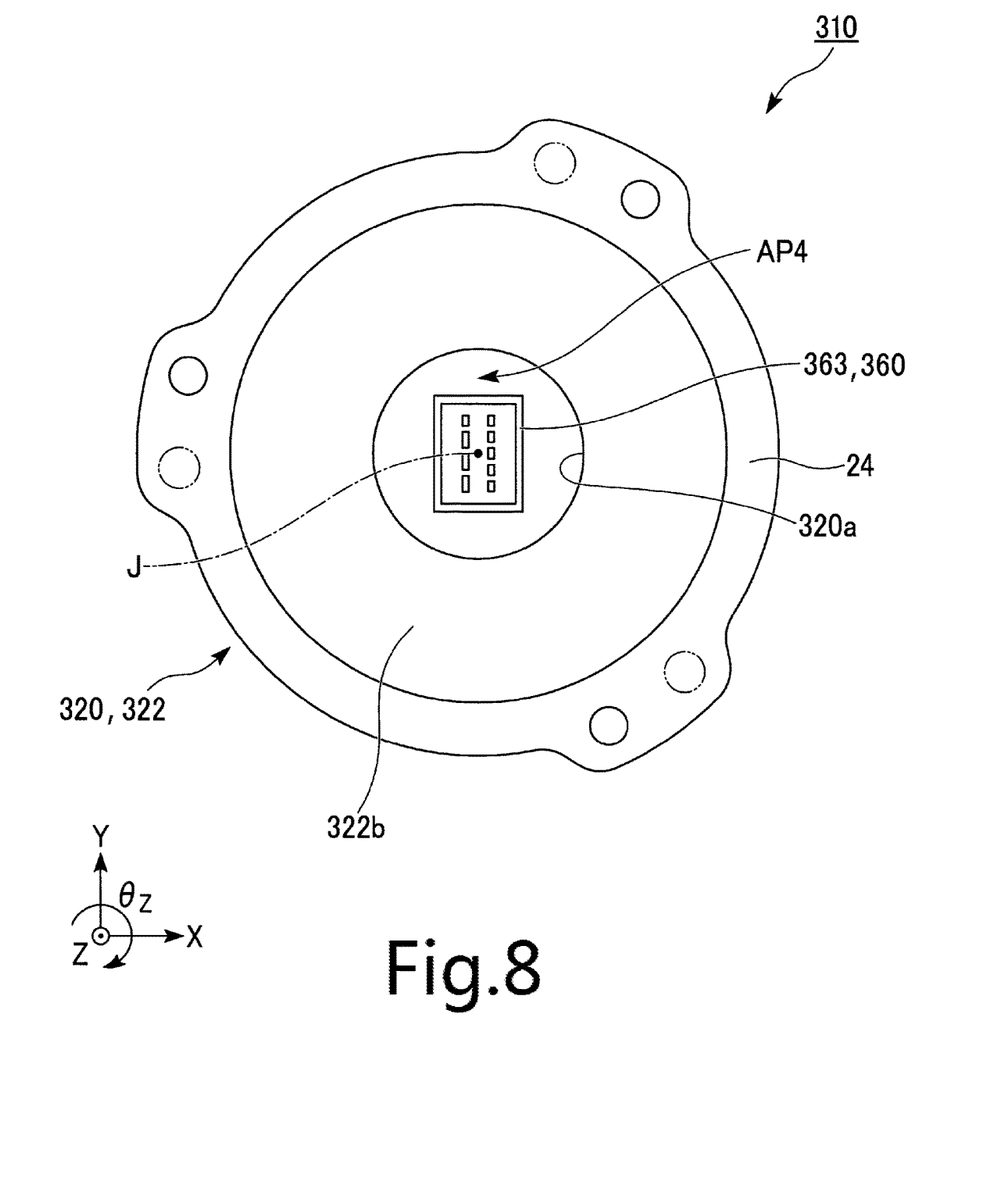
FIG. 8 is a plan view of a motor according to yet another embodiment of the present invention.

FIG. 8 is a plan view of a motor 310 according to yet another embodiment of the present invention. Referring to FIG. 8, the motor 310 includes a case 320 and a busbar unit 360. The case 320 includes a motor cover 322. The motor cover 322 includes a cover top portion 322*b*.

The case 320 includes a case through hole 320*a*. The case through hole 320*a* is defined in the cover top portion 322*b*. The case through hole 320*a* is arranged to pass through the cover top portion 322*b* in the axial direction, and is open upwardly. An edge of the case through hole 320*a* is circular in shape, and has a central axis J passing through a center thereof. The busbar unit 360 includes a connector portion 363. Note that the edge of the case through hole 320*a* is not limited to the circular shape, but may alternatively be in another shape.

The connector portion 363 is arranged to extend upward from a holder body portion 62 (not shown in FIG. 8). The connector portion 363 is arranged to pass through the case through hole 320*a* and project upward above the motor cover 322. The connector portion 363 is arranged in a center of the motor 310. That is, in FIG. 8, the central axis J passes through a center of the connector portion 363 in a plan view.

A gap AP4 is defined radially between the connector portion 363 and the edge of the case through hole 320*a*. In FIG. 8, the gap AP4 is arranged to extend in the circumferential direction all the way around the connector portion 363. The gap AP4 allows the connector portion 363 to be rotated in the circumferential direction with at least a portion of the connector portion 363 being arranged in the case through hole 320*a* before a housing 21 and the motor cover 322 are fixed to each other. That is, the gap AP4 is defined between the connector portion 363 and the edge of the case through hole 320*a*. The connector portion 363 is rotatable within the gap AP4. The other features of the motor 310 are substantially the same as the corresponding features of the motor 10 illustrated in FIGS. 1 to 5

Note that the connector portion 63 may not protrude out of the case 20. Not the connector portion 63 but any other portion of the busbar holder 61 may be arranged to protrude out of the case 20.

Also note that the busbar holder 61 may not include the upper bearing holding portion 65. Also note that the lower O ring 81 may not be arranged radially between the housing 21 and the holder body portion 62. Also note that the phase busbars 91 may not be provided.

Also note that the circuit board 71 may not be provided. In this case, the rotation sensors 72 are directly attached to the busbar holder 61.

Features of the above-described embodiments and the modifications thereof may be combined appropriately as long as no conflict arises.

While embodiments of the present invention have been described above, it is to be understood that variations and modifications will be apparent to those skilled in the art without departing from the scope and spirit of the present invention. The scope of the present invention, therefore, is to be determined solely by the following claims.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A motor comprising:
    a rotor comprising a shaft having a central axis extending in a vertical direction as a center thereof;
    a bearing arranged to support the shaft;
    a stator arranged radially outside of the rotor;
    a busbar unit arranged on an upper side of the stator;
    a case arranged to accommodate the rotor, the stator, and the busbar unit;
    a sensor magnet arranged on the upper side of the stator, and fixed directly or indirectly to the shaft; and
    a rotation sensor held by the busbar unit, and arranged axially opposite to the sensor magnet; wherein
    the case comprises:
        a cylindrical housing arranged to hold the stator, and having an opening portion at a top thereof; and
        a motor cover fitted to an upper side of the housing, and arranged to cover the upper side of the stator;
    the busbar unit comprises:
        a sensor busbar electrically connected to the rotation sensor; and
        a busbar holder arranged at the opening portion to hold the sensor busbar;

the case comprises a case through hole arranged to open into a space outside of the case;

the busbar holder comprises:
- a cylindrical holder body portion having at least a portion thereof arranged radially inside of the opening portion; and
- a protruding portion arranged to protrude out of the case, and having at least a portion thereof arranged in the case through hole; and a gap is defined circumferentially between the protruding portion and an edge of the case through hole.

2. The motor according to claim 1, wherein the protruding portion is arranged to project out of the case through the case through hole.

3. The motor according to claim 1, wherein the protruding portion is a connector portion to which an external power supply is connected.

4. The motor according to claim 3, wherein
the case through hole is arranged to open radially outwardly;
the connector portion is arranged to project radially outward from the holder body portion; and
the case through hole is arranged in at least one of the housing and the motor cover.

5. The motor according to claim 1, wherein the busbar holder comprises a bearing holding portion arranged to hold the bearing.

6. The motor according to claim 1, wherein the case through hole is arranged axially between the motor cover and the housing.

7. The motor according to claim 6, wherein
the motor cover comprises a cover recessed portion recessed upward from a lower end of the motor cover; and
the cover recessed portion is arranged to define a portion of the case through hole.

8. The motor according to claim 6, wherein
the housing comprises a housing recessed portion recessed downward from an upper end of the housing; and
the housing recessed portion is arranged to define a portion of the case through hole.

9. The motor according to claim 1, wherein
the busbar unit comprises a phase busbar electrically connected to the stator;
the busbar holder comprises a holder bottom portion arranged to extend radially inward from an inner circumferential surface of the holder body portion;
the holder bottom portion comprises a bottom portion through hole arranged to pass through the holder bottom portion in an axial direction;
the bottom portion through hole has a connection wire to connect the stator to the phase busbar passed therethrough; and
the bottom portion through hole is arranged to extend in a circumferential direction.

10. The motor according to claim 1, further comprising an O ring arranged radially between the housing and the holder body portion.

11. The motor according to claim 1, wherein
the housing comprises a housing flange portion arranged to extend radially;
the motor cover comprises a cover flange portion arranged to extend radially; and
the motor cover and the housing are fixed to each other with an upper surface of the housing flange portion and a lower surface of the cover flange portion being in contact with each other.

12. The motor according to claim 11, wherein
at least a portion of the case through hole is defined in the housing; and
a lower end of the case through hole is arranged at a level lower than that of the housing flange portion.

13. The motor according to claim 1, wherein the sensor busbar is arranged to radially overlap with the case through hole.

14. The motor according to claim 1, further comprising a circuit board held by the busbar unit, wherein the rotation sensor is attached to the circuit board.

* * * * *